United States Patent [19]
Despres

[11] Patent Number: 5,464,973
[45] Date of Patent: Nov. 7, 1995

[54] DEVICE FOR IDENTIFYING AN OBJECT BY MEANS OF AN INSERT INCORPORATED INTO THAT OBJECT

[76] Inventor: Jean-Albert Despres, 5, Rue des Seigneurs, 41300 Souesmes, France

[21] Appl. No.: 204,226

[22] PCT Filed: Jul. 2, 1993

[86] PCT No.: PCT/FR93/00680

§ 371 Date: Mar. 2, 1994

§ 102(e) Date: Mar. 2, 1994

[87] PCT Pub. No.: WO94/01836

PCT Pub. Date: Jan. 20, 1994

[30] Foreign Application Priority Data

Jul. 3, 1992 [FR] France .................. 92 08270

[51] Int. Cl.$^6$ ............................................. G06K 19/06
[52] U.S. Cl. .................... 235/494; 235/491; 235/487; 378/51; 209/588; 209/589; 209/583
[58] Field of Search ............................ 235/494, 491, 235/487, 375, 439, 464, 468, 449; 283/109; 378/51, 53, 54; 209/583, 588, 589

[56] References Cited

U.S. PATENT DOCUMENTS

| | | | |
|---|---|---|---|
| 2,983,354 | 5/1961 | Ember et al. | 235/491 X |
| 4,136,778 | 1/1979 | Wortman et al. | 209/589 |
| 4,354,387 | 10/1982 | Jones et al. | 73/597 |
| 5,301,238 | 4/1994 | Apter et al. | 235/464 X |

FOREIGN PATENT DOCUMENTS

| | | | |
|---|---|---|---|
| 0411602 | 2/1991 | European Pat. Off. | 235/468 |
| 2625348 | 6/1989 | France . | |
| 0273981 | 11/1988 | Japan | 235/494 |
| 655590 | 8/1980 | Switzerland . | |

*Primary Examiner*—Donald Hajec
*Assistant Examiner*—Michael G. Lee
*Attorney, Agent, or Firm*—Steinberg, Raskin & Davidson

[57] ABSTRACT

A device for the identification of an object possibly to select that object among other objects, including an insert incorporated to the object exhibiting shape parameters constituting a code for the identification of the object and detectable by a detection device such as a beam of X-rays or of ultrasound signals or a magnetic field and an emitter of the detection device after the interaction with the insert, wherein the insert exhibits a spherical shape having several concentric spherical elements made from materials having a transparency to the detection device different from one element to another one and increasing from the center to the periphery of the insert, the shape parameters consisting of the diameters of the elements, the invention being usable in the field of the mounting of automotive vehicles for example.

17 Claims, 1 Drawing Sheet

DEVICE FOR IDENTIFYING AN OBJECT BY MEANS OF AN INSERT INCORPORATED INTO THAT OBJECT

BACKGROUND OF THE INVENTION

The invention relates to a device for the identification of an object, possibly for selecting that object from among other objects, of the type comprising an insert incorporated into the object and exhibiting shape parameters forming a code for the identification of the object and detectable with the assistance of a detection means such as a beam of X-rays or ultrasounds or a magnetic field and an emitter of the detection means as well as a receiver of the detection means after interaction with the insert.

One already knows devices of this type. The shape parameters of the insert are constituted by a portion of a particular configuration such as a notch possibly of complex shape or a surface carrying a bar-code for example.

Inserts of this type have proved to be not usable in some application cases. Thus for providing complex structures such as automotive vehicles from parts prefabricated with the assistance of robots and of automatic mounting production lines it is necessary to be able to select each part from among a great number of other parts. To solve this problem, one has contemplated to incorporate into these parts identification inserts. Now one has become aware of the inconvenience of the inserts used heretofore which resides in the fact that the identification safety of the parts to be selected is very low in view of the variation of the orientation of the insert in the beam or field of the detection means. To the extent where it is too expensive and practically impossible to always provide for the same orientation of the insert, this mode besides very effective of identification is not applicable in all the cases of utilization where that orientation invariable from one part to another one may not be strictly provided for.

OBJECTS AND SUMMARY OF THE INVENTION

The present invention has as its object to propose a device for the identification of an object by means of an insert, of the type described hereinabove, which is applicable to cases of utilization excluded until now.

To reach that goal the device according to the invention is characterized in that the insert exhibits a spherical shape comprising several concentric spherical elements which are made from materials having a transparency to the detection means, different from one element to another one and increasing from the center to the periphery of the inserts, the shape parameters being formed of the diameters of the concentric elements.

BRIEF DESCRIPTION OF THE DRAWINGS

The invention will be better understood and further objects, characteristics, details and advantages thereof will appear more clearly in the course of the explanatory description which will follow, made with reference to the attached diagrammatic drawings given by way of example only illustrating several embodiments of the invention and in which.

DETAILED DESCRIPTION OF THE INVENTION

Figure 1:
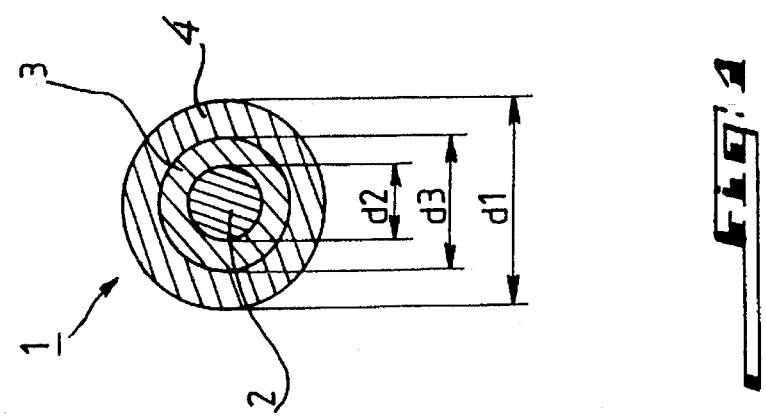
FIG. 1 is a view in section of an insert of spherical shape according to the invention which passes through the center of that insert.

As FIG. 1 shows it, an insert according to the invention exhibits a spherical shape and consists of a plurality of concentric spherical elements. In the example of FIG. 1, the insert 1 comprises three concentric elements bearing the reference numerals 2, 3 and 4 in the direction from the center to the periphery. The different concentric elements are made from different materials selected so that the transparency to the detection means of the intermediate element 3 is greater than that of the central element 2 and smaller than that of the radially external element 4. The structure of the insert 1 is characterized by the different diameters d1, d2 and d3 of these component elements 2 to 4.

Figure 2:
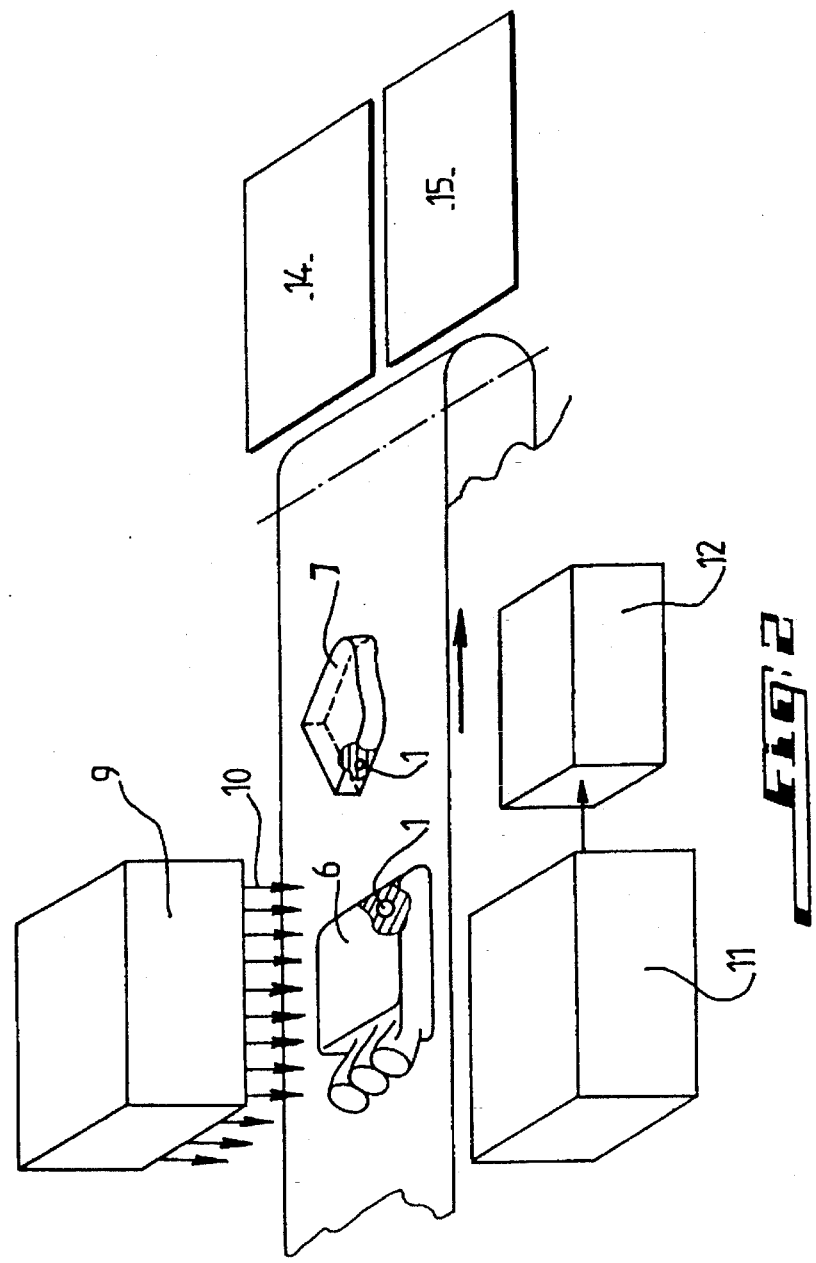
FIG. 2 is a diagrammatic perspective view with parts broken away of an identification device according to the invention involving the use of an insert according to FIG. 1 with the background of an example of utilization.

As shown on FIG. 2 to identify the object such as a building part 6 or 7, one incorporates the insert 1 into the part. As illustrated by FIG. 2, the structure of the insert is detectable with the assistance of an equipment comprising an emitter 9 of the detection means 10 such as the emitter of a beam of X-rays, a beam of ultrasound signals or of a magnetic field; and a receiver 11 of the detection means after its interaction with the insert. It is of course necessary that the transparency to the detection means of the material of the building part 6 or 7 be much greater than that of the radially external element 4 of the insert. Under these conditions, the receiver 11 will be capable of restoring the structure of the insert as a projection image making the different component elements of the inserts and the dimensions of the latter appear clearly. The material constituting the parts 6, 7 should of course be transparent to the detection means. With the assistance of a device for working this image according to a suitable calculation program, a computer device 12 may establish the identification code formed of formations of ratios of the diameters d1, d2 and d3.

In accordance with the result provided by the device 12 in the example shown, the part 6 or 7 will be transferred by means not shown but known per se towards the reception area 14 or 15.

By way of example when one uses X-rays as a detection means, the central element 2 of the insert could be made from lead and the elements 3 and 4 could be made from silver and alumina, respectively. These materials are only cited by way of example to illustrate the increase of the transparency to the X-rays from the center to the periphery of the insert. Any other combination of materials which meets this requirement relating to the transparency of the materials may be adopted. It is obvious that the possible coding combinations may be increased by variation of the diameters and/or by variation of the number of concentric elements.

One easily understands that in view of its spherical shape, the detection safety of the insert is not affected by a modification of the position of the parts 6 or 7 in the detection means. In the same manner the positioning of the insert within its receiving object does not raise any problem, likewise in view of the spherical shape of the insert.

What is claimed is:

1. In an arrangement for identifying an object in order to select that object from among other objects, including an emitter for emitting detection means, said detection means constituting a beam of X-rays or ultrasound signals, an insert incorporated into said object, said insert constituting an identification code of said object and being detectable by said detection means, and a receiver situated opposite said emitter such that said objects pass therebetween and said detection means interact with said insert, the improvement comprising said insert having a spherical shape and comprising a plurality of concentric spherical elements made from materials having a transparency to said detection means which are different from one element to another, the transparency of said materials of said spherical elements increasing from an innermost one of said spherical elements including a center of said spherical insert to an outermost one of said spherical elements including a periphery of said spherical insert, the diameters of said spherical elements constituting shape parameters indicative of the identification code of said object, said object into which said insert is incorporated having a transparency greater than the transparency of the outermost spherical element, and said receiver receiving said detection means after interaction with said insert and reproducing the diameters of said spherical elements of said insert to enable identification based thereon.

2. An arrangement according to claim 1, wherein the diameters of said spherical elements are varied and the variation in diameter constitutes the identification code.

3. An arrangement according to claim 2, further comprising computer means coupled to said receiver for establishing the variation in diameter of said spherical elements.

4. An arrangement according to claim 3, wherein said insert comprises three concentric spherical elements.

5. An arrangement according to claim 4, wherein an innermost one of said three spherical elements is made of lead, an outermost one of said three spherical elements is made of alumina and an intermediate one of said three spherical elements situated between said innermost spherical element and said outermost spherical element is made of silver.

6. An arrangement according to claim 1, wherein said insert comprises three concentric spherical elements.

7. An arrangement according to claim 6, wherein an innermost one of said three spherical elements is made of lead, an outermost one of said three spherical elements is made of alumina and an intermediate one of said three spherical elements situated between said innermost spherical element and said outermost spherical element is made of silver.

8. An arrangement for identifying an object from among other objects, comprising an emitter for emitting detection means, said detection means constituting a beam of X-rays or ultrasound signals, an insert incorporated into said object, said insert exhibiting shape parameters constituting a identification code of said object and being detectable by said detection means, said insert having a spherical shape comprising a plurality of concentric spherical elements made from materials having a transparency to said detection means which are different from one element to another, the transparency of said materials of said spherical elements increasing from an innermost one of said spherical elements including a center of said spherical insert to an outermost one of said spherical elements including a periphery of said spherical insert, the diameters of said spherical elements constituting said shape parameters indicative of the identification code of said object, said object into which said insert is incorporated having a transparency greater than the transparency of the outermost spherical element, and a receiver situated opposite said emitter such that said objects pass therebetween and said detection means interact with said insert, said receiver receiving said detection means after interaction with said insert and reproducing the diameters of said spherical elements of said insert to enable identification based thereon.

9. The arrangement of claim 8, wherein the diameters of said spherical elements are varied and the variation in diameter constitutes the identification code.

10. The arrangement of claim 9, further comprising computer means coupled to said receiver for establishing the variation in diameter of said spherical elements.

11. The arrangement of claim 10, wherein said insert comprises three concentric spherical elements.

12. The arrangement of claim 11, wherein an innermost one of said three spherical elements is made of lead, an outermost one of said three spherical elements is made of alumina and an intermediate one of said three spherical elements situated between said innermost spherical element and said outermost spherical element is made of silver.

13. The arrangement of claim 8, wherein said insert comprises three concentric spherical elements.

14. The arrangement of claim 13, wherein an innermost one of said three spherical elements is made of lead, an outermost one of said three spherical elements is made of alumina and an intermediate one of said three spherical elements situated between said innermost spherical element and said outermost spherical element is made of silver.

15. An identification insert for incorporation into an object, comprising a plurality of concentric spherical elements, adjacent ones of said spherical elements being coupled to one another to form the insert, said spherical elements being made from materials having different transparencies, the transparency of said materials of said spherical elements increasing from an innermost one of said spherical elements to an outermost one of said spherical elements.

16. The insert of claim 15, wherein said insert comprises three concentric spherical elements.

17. The insert of claim 16, wherein an innermost one of said three spherical elements is made of lead, an outermost one of said three spherical elements is made of alumina and an intermediate one of said three spherical elements situated between said innermost spherical element and said outermost spherical element is made of silver.

* * * * *